United States Patent
Morris

(10) Patent No.: US 7,953,925 B2
(45) Date of Patent: May 31, 2011

(54) TRANSPARENT DATA TEMPERATURE SENSITIVE CLUSTER DUPLICATION

(75) Inventor: John Mark Morris, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 604 days.

(21) Appl. No.: 11/953,109

(22) Filed: Dec. 10, 2007

(65) Prior Publication Data

US 2008/0162779 A1    Jul. 3, 2008

Related U.S. Application Data

(60) Provisional application No. 60/878,038, filed on Dec. 29, 2006.

(51) Int. Cl.
*G06F 12/00*    (2006.01)
(52) U.S. Cl. . 711/112; 711/162; 711/170; 711/E12.001; 707/655; 707/E17.091

(58) Field of Classification Search .................. 707/655
See application file for complete search history.

(56) References Cited

U.S. PATENT DOCUMENTS

| 6,266,742 | B1* | 7/2001 | Challenger et al. | 711/133 |
| 7,373,469 | B2* | 5/2008 | Tanaka et al. | 711/162 |
| 2003/0236933 | A1* | 12/2003 | Shigeta et al. | 710/72 |
| 2005/0262317 | A1* | 11/2005 | Nakanishi et al. | 711/162 |
| 2006/0112140 | A1* | 5/2006 | McBride et al. | 707/104.1 |

* cited by examiner

*Primary Examiner* — Michael C Krofcheck

(57) ABSTRACT

A method of selecting candidates for data cluster duplication that can be used as an alternative or as an addition to existing duplication techniques. The method determines a read temperature of a data cluster. If the read temperature of the data cluster exceeds a threshold value, a write temperature of the data cluster is determined. If the write temperature of the data cluster is below a threshold value the cluster is selected for duplication.

29 Claims, 5 Drawing Sheets

TRANSPARENT DATA TEMPERATURE SENSITIVE CLUSTER DUPLICATION

CROSS REFERENCE TO RELATED APPLICATIONS

This application claims priority under 35 U.S.C. §119(e) to the following co-pending patent application, which is incorporated herein by reference:

Provisional Application Ser. No. 60/878,038, entitled "TRANSPARENT DATA TEMPERATURE SENSITIVE CLUSTER DUPLICATION," filed on Dec. 29, 2006, by John Mark Morris.

BACKGROUND

Computer systems generally include one or more processors interfaced to a temporary data storage device such as a memory device, and/or one or more persistent data storage devices such as disk drives. Contention for frequently accessed shared storage data can be a bottleneck to system performance. If one area of a disk is frequently accessed this can lead to slow access times as numerous requests are made for data in that area of the storage device. The performance demand for these data areas can also create a hotspot on a disk device, bus, controller, or adaptor that slows access to other data areas sharing that particular data path.

Clusters are data areas on a disk. Each cluster can store a set amount of data. When data is stored it may require only part of a cluster, a single cluster or more than one cluster. One approach to ease congestion on a particular data path is to create multiple physical copies of the logical data clusters so as to provide multiple sources of data via multiple data paths. A disadvantage of this technique is the difficulty in determining which storage clusters are good candidates for application of duplication technology. A second disadvantage is the overhead and synchronization required to maintain multiple physical copies of data clusters. Overhead and synchronization is particularly a problem for data clusters that are frequently updated. A third disadvantage is that some applications rely on a committed amount of capacity being available from the storage subsystem.

SUMMARY

Described below is a method of selecting candidates for data cluster duplication that can be used as an alternative or as an addition to existing duplication techniques. One technique described below involves determining a read temperature of a data cluster. If the read temperature of the data cluster exceeds a threshold value determine a write temperature of the data cluster. If the write temperature of the data cluster is below a threshold value the cluster is selected for duplication.

Also described below are methods of selecting candidates for data cluster duplication involving determining a read temperature of the data cluster. A write temperature is also determined for the cluster. If the read temperature is above a read threshold value and the write temperature is below the write threshold value the cluster is selected for duplication.

DETAILED DESCRIPTION

Figure 1:
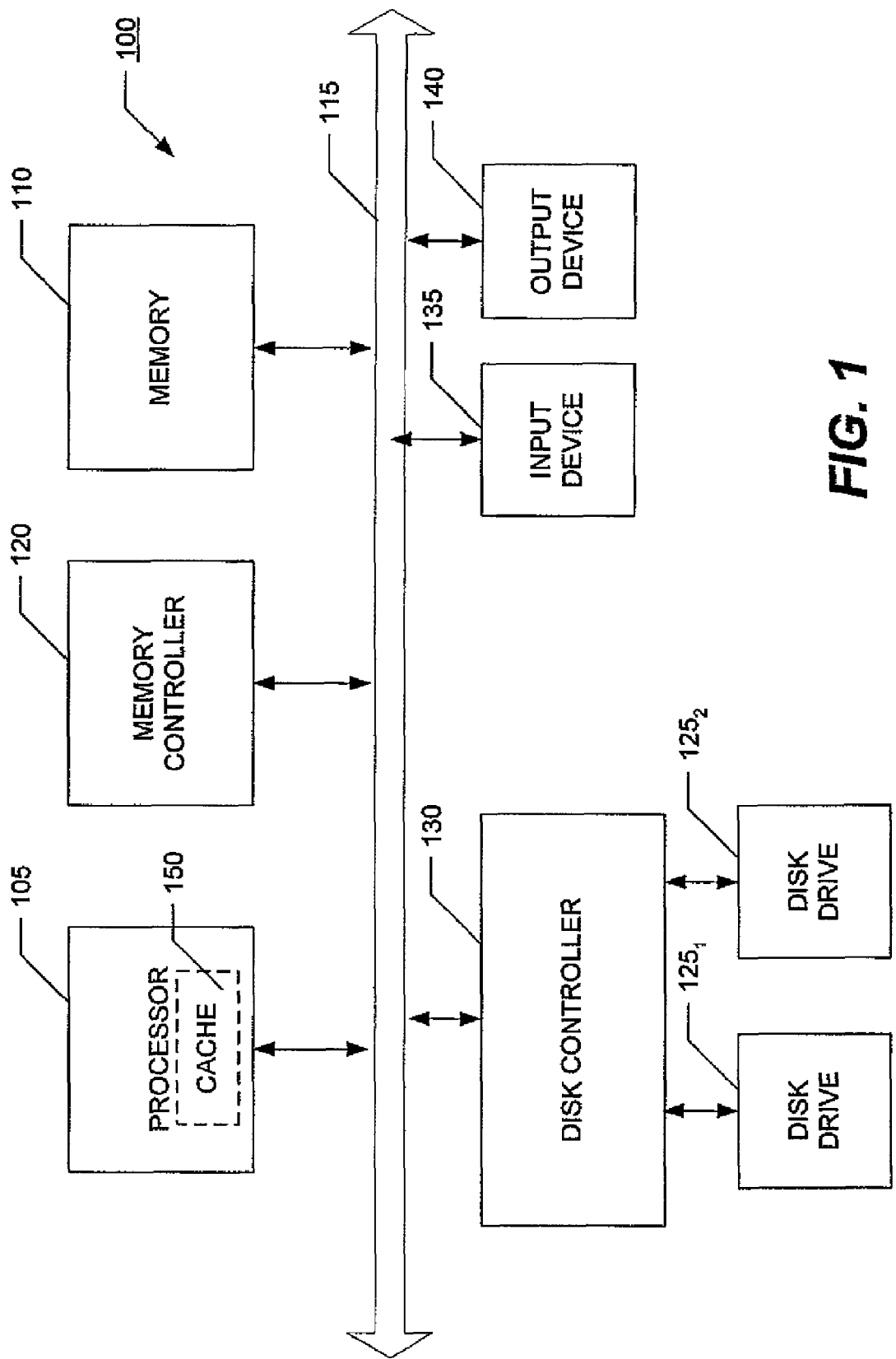
FIG. 1 is a block diagram of a computer system having a memory

FIG. 1 shows a computer system 100 suitable for implementation of a method of transparent data temperature sensitive cluster duplication. The system 100 includes on or more processors 105 that receive data and program instruction from a temporary data storage device, such as a memory device 110, over a communications bus 115. A memory controller 120 governs the flow of data into and out of the memory device 100. The system 100 also includes one or more persistent data storage devices, such as disk drives $125_1$, and $125_2$ that store chunks of data or data objects in clusters. Disk controllers 130 manage the storage of data in clusters. One or more input devices 135, such as a mouse and a keyboard, and output devices 140, such as a monitor and a printer, allow the computer system to interact with a human user and with other computers.

The disk controller 130 receives requests from the memory controller 120 to store data objects on the disk drives 125 and to retrieve data objects from the disk drives. Repeated requests for data to be transferred to or from the disk drives has the potential to create a bottleneck between the disk drives 125 and the disk controller(s) 130. Such a bottleneck can affect performance of the computer system 100 due to the delay in transmitting or transferring data objects from the disk drives to the disk controller for subsequent transfer over the communications bus 115.

The techniques described below involve selecting cluster candidates for duplication. Once clusters are duplicated information requests can be routed to the least busy storage device containing an image of the cluster or the device with the expected quickest access time.

Figure 2:
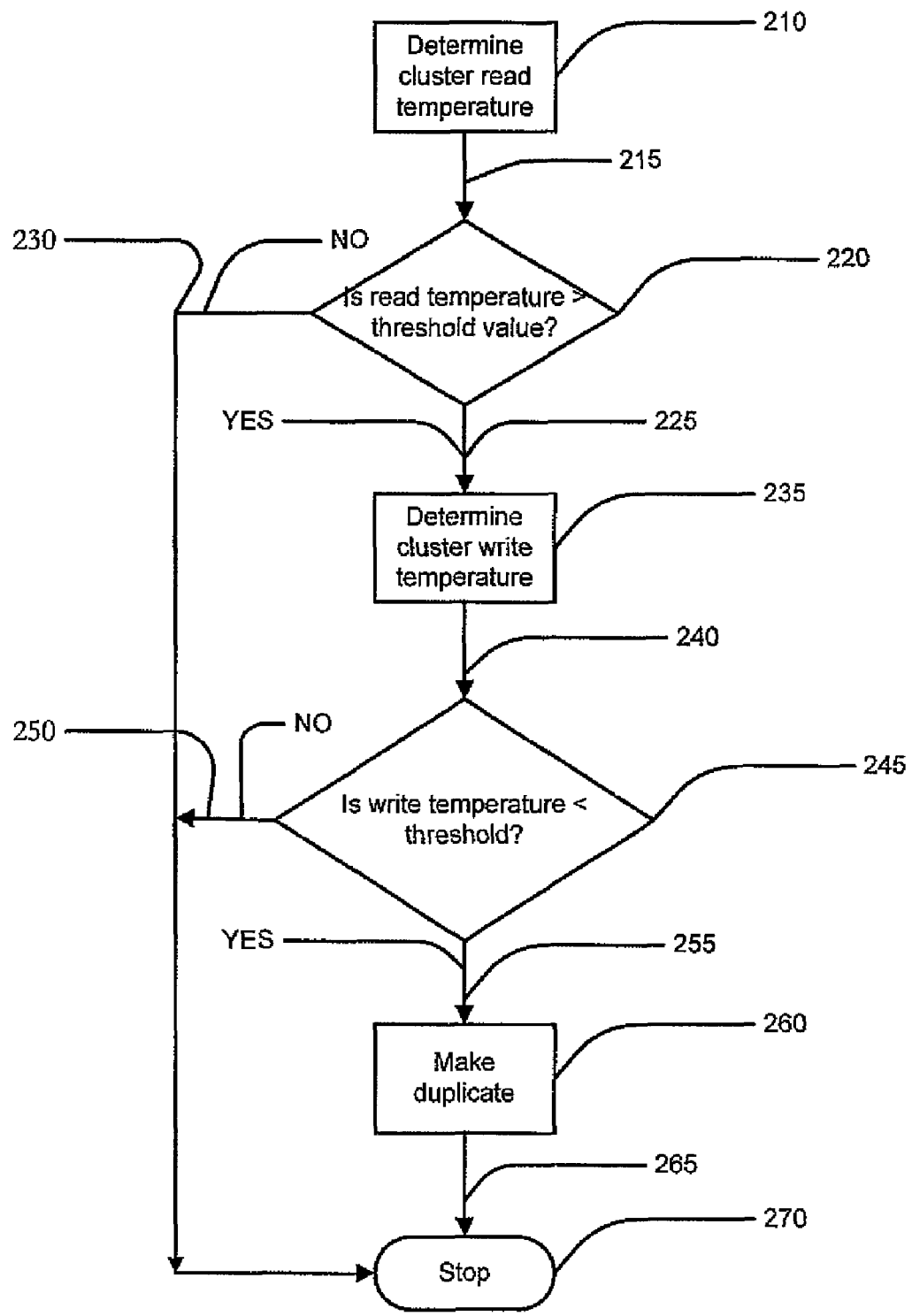
FIG. 2 is a flow chart of a technique for selecting clusters as candidates for duplication.

FIG. 2 shows an example of one technique for selecting cluster candidates for duplication. Candidates for duplication are chosen as clusters having a high read temperature and a low write temperature. The temperature value is an artificial value assigned to a cluster to represent the access rate or potential access rate of that cluster. An analogy can be drawn between the temperature value assigned to a data object and a physical object. A physical object that passes through a congested pipe encounters friction and experiences an increase in physical temperature. During periods where the physical object remains stationary, it is not subject to friction and the physical temperature of the physical object drops. In this regard, a temperature value assigned to a data object represents the number of accesses or amount of traffic to and from the data object and the movement of the data object between disk drives 125, memory 110 and data cache 150.

In one form, temperature values are selected from an ordered set of temperature values. In one example the ordered set represents all temperature grades namely hot pacing, hot, warm and cool. The set is preferably ordered so that a temperature of hot pacing has a higher value assigned to it than a temperature of cool. It will be appreciated that the terminology for each grade and the number of temperature values in the ordered set could be varied.

As an alternative the temperature value is a numerical value, for example a temperature in Fahrenheit. A temperature of 0° F. is assigned to a data object that is unlikely to be read or written to whereas a data object that could almost certainly be read or written to is assigned a temperature value of 200° F., for example.

The read temperature is determined for a physical cluster (step 210). Read temperature values are determined using a simple count of frequency of read access over a time period T. The count of frequency of read access gives a value that can be then used as a temperature (Fahrenheit) value or converted into a temperature grade. As an alternative a read temperature can be determined as a count of frequency of read access over a time period T with different weightings applied. A frequency can be weighted by transfer size, read/write polarity, number of copies of data, or other factors. These factors make the temperature model the critical resource of this storage device, such as the aggregate head time on a Winchester disk Aggregate head time can be set equal to (reads×read_head_time)+(number of copies×writes×write_head_time), where head_time is a function of transfer size.

In another alternative, critical periods of the day are given a higher weighting in the temperature profile than non critical periods. For example accesses during the 9 am to 2 pm period for week days can be weighted higher than accesses outside of those periods. More than two time periods could be specified with different weightings.

Once the read temperature of a cluster is determined the system queries whether the read temperature is greater than a read temperature threshold value (step 220). The threshold value is set so that the most commonly accessed clusters will have a read temperature greater than the threshold value and the less commonly accessed clusters will have a read temperature lower than the threshold value. In one example the temperature value is a temperature in Fahrenheit where the most frequently accessed data may have temperature values of 200° F. The read temperature threshold may be set to 175° F. If the read temperature is less than the threshold value then arrow 230 is followed to the end of the algorithm.

If the read temperature is greater than the threshold value the write temperature is determined for the cluster (step 235). The write temperature can be determined in the same way as read temperature. Once the write temperature is determined the question is asked whether the write temperature is less than a threshold value (step 245). The write temperature threshold value is set in the same way as the read temperature threshold value is set. The write temperature threshold is set to be a low value so that candidates for duplication have a high read temperature but a low write temperature. This mechanism is used to control the amount of updating or copy management for clusters which are written. If the write temperature is above the threshold value then arrow 250 is followed and the algorithm ends.

The time periods over which temperature is taken are variable. The time period could be measured over periodic intervals such as weeks, days or hours. Alternatively the time periods could be business intervals such as the peak part of a work day or the peak part of batch query processing.

If the write temperature is below the write temperature threshold value a duplicate is made of the data in the cluster. Duplicates may be placed on the same physical disks as the original cluster so that the system can access the closest copies. In other examples duplicates are placed on different disks if disks vary in activity. In this example a read or write request can be routed to the least busy disk.

Once a cluster is selected for duplication, duplication is performed on the cluster. In one example, the entire cluster to be duplicated is locked for write access and then the data in the cluster is copied to a newly allocated location. Once the copy is complete the write lock on the cluster is released. This process prevents other processors from writing to the cluster during the copy operation.

As an alternative, a moving window is be used during the copying operation. In this alternative only a portion of the cluster is locked for write access at anyone time. Writes to areas already copied are mirrored to the copy. Writes to areas beyond the window and not yet copied occur naturally. Writes to the window are blocked by the lock. In this alternative there is potentially less contention for the right to write to portions of the cluster because only a portion of the cluster is locked at any one time.

Once a duplicate is created read access to the data can go to any copy of the duplicated cluster. Writing to the data must be done to all copies.

Figure 3:
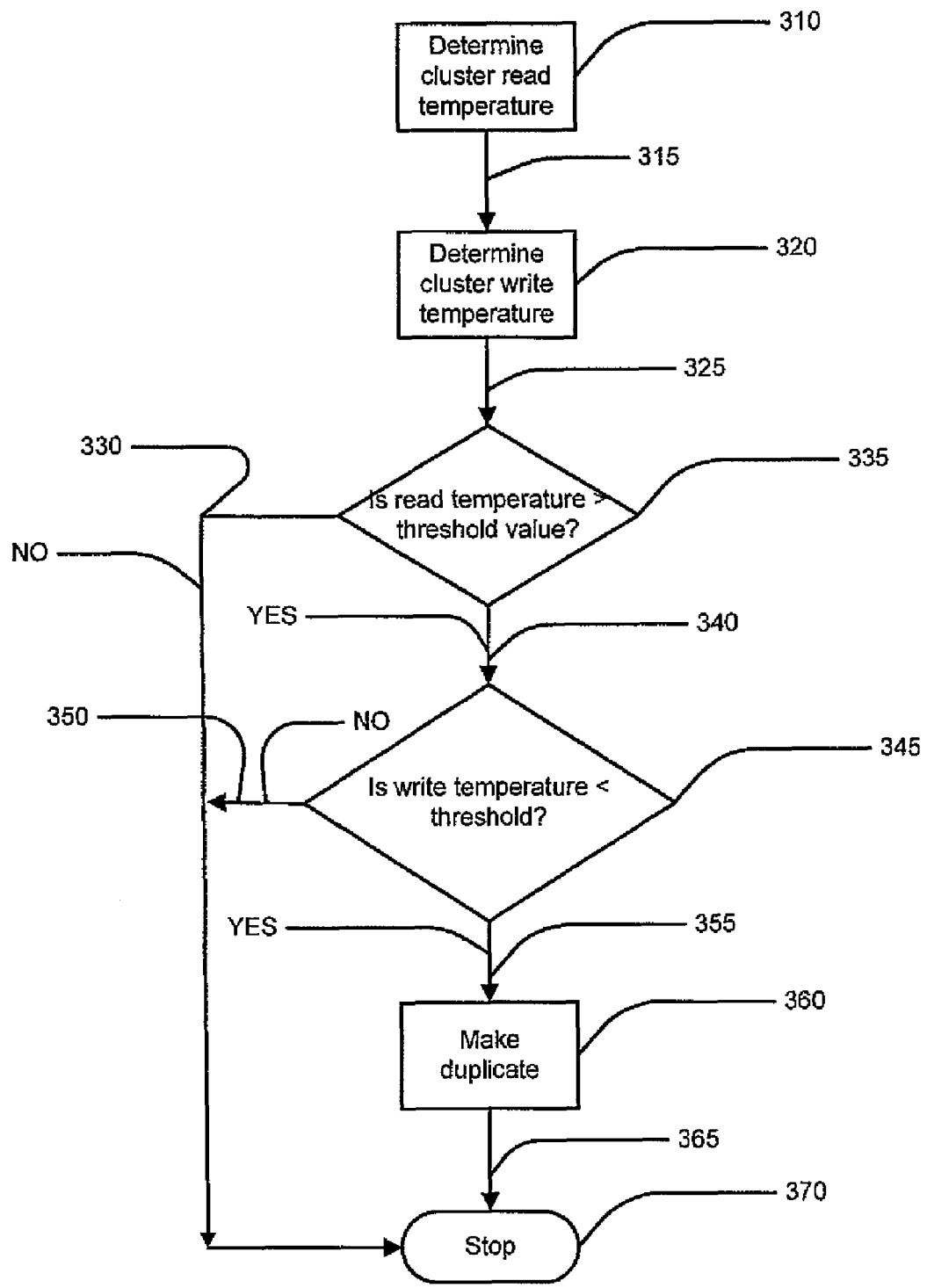
FIG. 3 is a flow chart of a technique for selecting clusters as candidates for duplication.

FIG. 3 shows an alternative technique for selecting cluster candidates for duplication. As with FIG. 2 candidates for duplication are chosen as clusters having a high read temperature and low write temperature. The read temperature is determined for a physical cluster (step 310). Read temperature values are determined using a simple count frequency of read access over a time period T. As an alternative a read temperature can be determined as a count frequency of read access over a time period T with different weightings applied. The count can be weighted by a transfer size, read/write polarity, number of copies of data, or other factors. The critical periods for the day can be given different weightings compared to non critical time periods.

Once the read temperature is determined the write temperature is determined for the cluster (step 320). The write temperature can be determined in the same way as the read temperature. Once the write temperature is determined the question is asked whether the read temperature is greater than the threshold value (step 335). The threshold value is set so that the most commonly accessed clusters will have a read temperature greater than the threshold value and that less commonly accessed clusters will have a read temperature lower than the threshold value. If the read temperature is lower than the threshold value, arrow 330 is followed and the algorithm ends.

If the read temperature exceeds the threshold value the question is asked whether the write temperature is less than the threshold (step 345). The write temperature threshold is set in the same way as the read temperature threshold is set. The write temperature threshold is set to be a low value so that candidates in duplication have a high read temperature but a low write temperature. If the write temperature is above the threshold value arrow 350 is followed to step 370 and the algorithm ends. If the write temperature is below the threshold value, then the cluster is determined as a candidate for duplication.

In step 360 a duplicate is made of the data in the cluster. Duplicates may be placed on the same physical disks so that the system can access close copies of the cluster. Another example, duplicates can be placed on different disks if the disk is vary in activity. In this example a read or right request can be routed to the least busy disk.

In all systems there is a finite amount of storage space available. The previous figures have shown methods for selecting candidates to duplicate when the read and write temperature of the candidate cluster falls within set boundaries. However, once a candidate is selected for duplication, duplication may not always take place. As the system approaches a capacity threshold, existing duplicates of data are discarded and the clusters taken up by that data returned to the free pool of clusters available for storage.

Duplication of clusters is managed by using a two threshold system. These thresholds can be set as percentages of capacity. The low capacity threshold is set to the lower percentage than the high capacity threshold. As capacity is available, duplicates of clusters may be made until utilization of the available storage space exceeds the low capacity threshold. As the amount of data stored exceeds the high capacity threshold all duplicates are released to free up more storage space.

As an example the duplication low capacity threshold could be set as 80% of the available capacity. The duplication high capacity threshold could be set at 90% of the available capacity. The maximum amount of duplication allowed can be set as 100% minus the high capacity threshold. In this example 10% of capacity is available for storing duplicated clusters. As data is stored, the percentage of the capacity used increases. Once the percentage of capacity used exceeds 80% (the duplication low capacity threshold) the system stops duplicating clusters. If the high capacity threshold is reached, then all duplicated clusters are released to make more storage capacity available. In this example, once 90% of the capacity is used all duplicates are released which may provide up to 10% of additional capacity.

Once a duplicate is created of a cluster, traffic to the cluster must be managed. If a write occurs to a cluster then all copies of that cluster must be updated. Management of writes can occur by waiting until each cluster is updated before returning a success code to the application that wrote to the cluster. Alternative variations are possible. In one alternative, the write occurs on one or two copies and then other writes are deferred and the copies of the clusters that have not been updated can not be read until the write completes.

Reads to clusters that have been duplicated are managed by routing a read request to the cluster on the storage device with the best expected response time. The best expected response time can be calculated through a weighed measurement favouring more recent observations or by checking the device queue length or by any other suitable method.

For each cluster, data is kept on read access and write access by a duplication management system. The data is updated as needs and writes occur. The data is used to determine whether or not the cluster is a candidate for duplication. The read and write temperatures of the data clusters fluctuate. For example, a cluster may have a low read temperature for a long period then have a high read temperature. As the read temperature of a cluster increases above the read threshold it become a candidate for duplication of the write temperature is below the write threshold.

The write temperature and read temperature of a data cluster by are assessed over a set time period. If the number of reads to a duplicated cluster decreases and the number of writes to a duplicated cluster increases the duplicate may be discarded when the read temperature fall below the read threshold and/or the write temperature exceeds the write threshold. As an alternative the duplicate may be discarded if the read temperature is still above the read threshold but the write temperature exceeds the write threshold.

Figure 4:
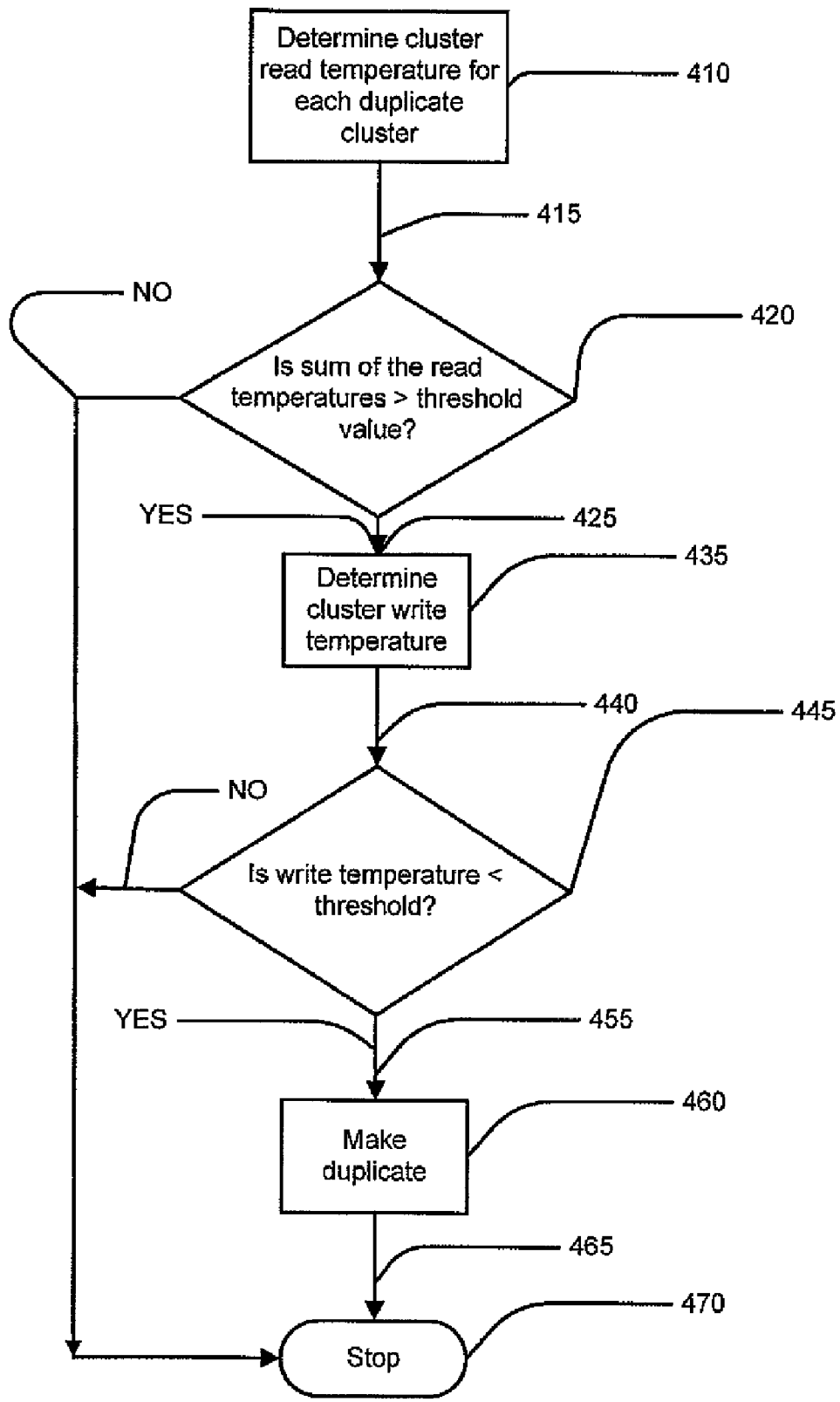
FIG. 4 is a flow chart of a technique of managing cluster duplication.

FIG. 4 shows one embodiment of an algorithm that can be used to determine whether to duplicate an already duplicated cluster. There are no limits to the number of duplicates that can be created by the cluster. The limiting feature controlled by the duplication management system is the amount of capacity available. In an extreme example if only one cluster is stored but this is continually accessed by read accesses only this cluster may be duplicated to fill the amount of capacity available for duplicates. The read and write thresholds may be the same or different for each additional duplicate of the cluster.

The data management system stores a read temperature for each cluster and a write temperature for each cluster. Where a cluster has been duplicated the write temperature will be the same for the original cluster and each of its duplicates as writes are performed on all duplicates. Each duplicate and the original may have its own read temperature as reads are only routed to one of the original cluster or duplicates. To determine whether to create a further copy of the duplicated cluster the read temperature for each of the original cluster and duplicates is taken (step 410). The read temperatures are summed (step 420) and the sum of the read temperatures is compared to a threshold value. If the sum of the read temperatures exceeds the threshold value then the write temperature is taken of either the original cluster or a duplicate (step 435). The write temperature is then compared to a threshold value (step 445). The overhead for performing writes increases as the number of duplicates increases. The write temperature threshold may be set as a different level depending on the number of duplicates of a data cluster. The write temperature is lower the more duplicates there are of a data cluster. If the write temperature falls below the write temperature threshold then a duplicate is created (step 460).

Figure 5:
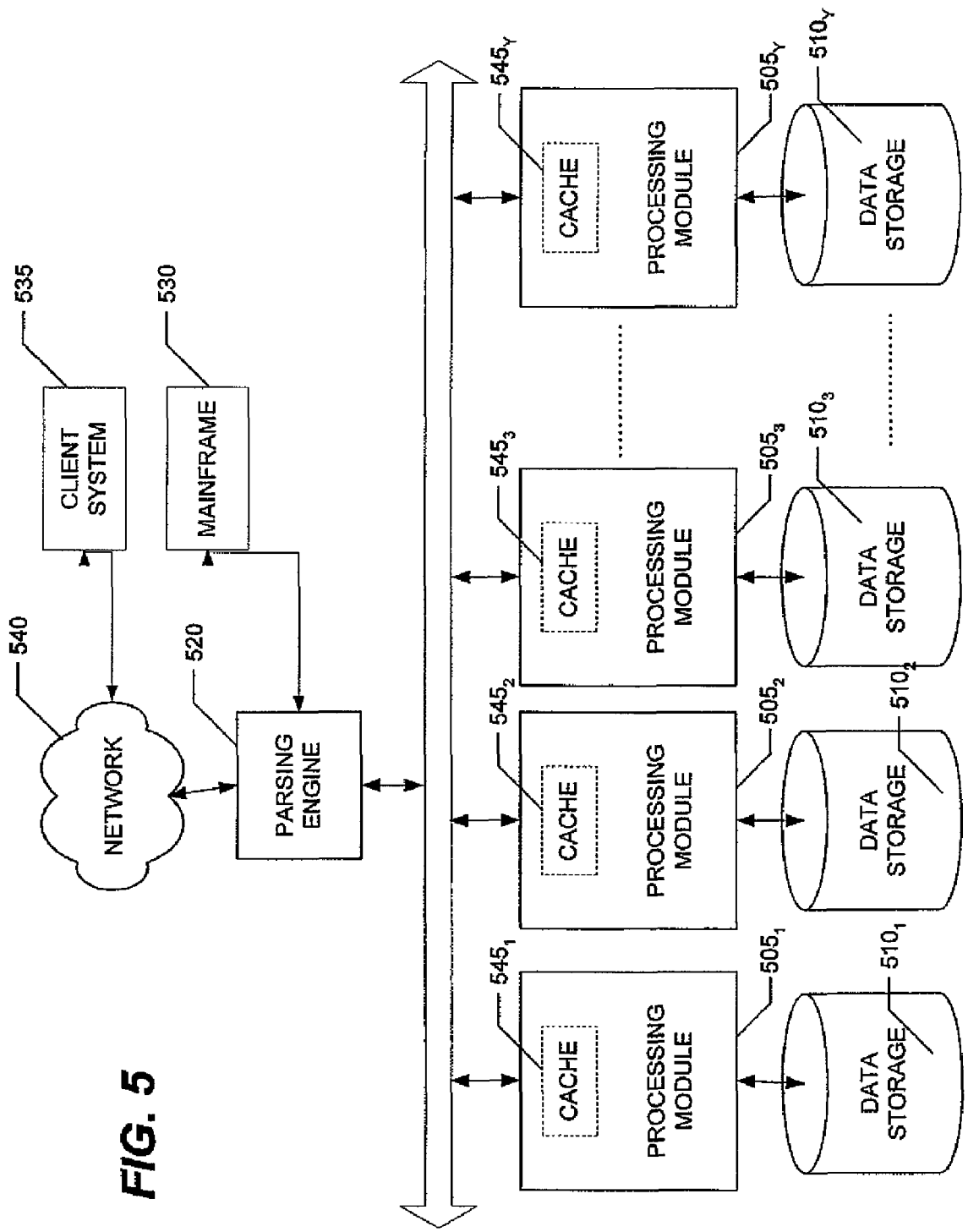
FIG. 5 is a block diagram of an exemplary large computer system in which the techniques described below are implemented.

FIG. 5 shows an example of one type of computer system in which the above techniques of data cache management is implemented. The computer system is a data warehousing system 500, such as a TERADATA data warehousing system sold by NCR Corporation, in which vast amounts of data are stored on many disk-storage facilities that are managed by many processing units. In this example, the data warehouse 500 includes a relational database management system (RDBMS) built upon a massively parallel processing (MPP) platform. Other types of database systems, such as object-relational database management systems (ORDBMS) or those bait on symmetric multiprocessing (SMP) platforms, are also suited for use here.

As shown here, the data warehouse 500 includes one or more processing modules $505_{1 \ldots y}$ that manage the storage and retrieval of data in data-storage facilities $505_{1 \ldots y}$. Each of the processing modules $505_{1 \ldots y}$ manages a portion of a database that is stored in a corresponding one of the data-storage facilities $510_{1 \ldots y}$. Each of the data-storage facilities $510_{1 \ldots y}$ includes one or more disk drives.

A parsing engine 520 organises the storage of data and the distribution of data objects stored in the disk drives among the processing modules $505_{1 \ldots y}$. The parsing engine 520 also coordinates the retrieval of data from the data storage facilities $510_{1 \ldots y}$ in response to queries received from a user at a mainframe 530 or a client computer 535 through a wired or wireless network 540. A data cache $545_{1 \ldots y}$ managed by the techniques described above is stored in the memory of the processing modules $505_{1 \ldots y}$.

The text above describes one or more specific embodiments of a broader invention. The invention also is carried out in a variety of alternative embodiments and thus is not limited to those described here. Those other embodiments are also within the scope of the following claims.

I claim:

1. A method of selecting candidates for data cluster duplication, the method comprising:
   determining, by a computer processer, a read temperature of a data cluster;
   when the read temperature of the data cluster exceeds a read duplication temperature threshold, determining, by the processor, a write temperature of the data cluster; and when the write temperature of the data cluster is below a write duplication temperature threshold, selecting, by the processor, the data cluster for duplication.

2. The method of claim 1 wherein the read duplication temperature threshold is greater than the write duplication temperature threshold.

3. The method of claim 1 further comprising determining, by the processor, whether capacity is available to store a duplicated cluster; and duplicating, by the processor, the selected data cluster and storing the duplicated cluster if there is capacity.

4. The method of claim 3 wherein the step of determining whether capacity is available comprises the steps of determining available capacity and comparing the available capacity to a capacity threshold; and if the capacity threshold is less than the available capacity, duplicating the selected data cluster and storing the duplicated cluster.

5. The method of claim 1 further comprising a step of:

releasing existing duplicated clusters if storage requirements of an existing duplicated cluster exceed a threshold value.

6. The method of claim 1 further comprising a step of re-evaluating, by the processor, clusters as candidates for cluster duplication.

7. The method of claim 6 wherein clusters are constantly re-evaluated, by the processor, as candidates for cluster duplication.

8. The method of claim 6 wherein clusters are periodically re-evaluated, by the processor, as candidates for cluster duplication.

9. The method of claim 1 further comprising:

determining, by the processor, a read temperature of a second data cluster;

when the read temperature of the second data cluster exceeds a second read duplication temperature threshold, determining, by the processor, a write temperature of the second data cluster; and when the write temperature of the second data cluster is below a second write duplication temperature threshold, selecting, by the processor, the second data cluster for duplication.

10. The method of claim 9 wherein (i) each of the read duplication temperature thresholds has a different weighting factor associated therewith and (ii) each of the write duplication temperature thresholds has a different weighting factor associated therewith.

11. A method of selecting candidates for data cluster duplication, the method comprising:

determining, by a computer processor, when a read temperature of a first data cluster is above a first read duplication temperature threshold;

determining, by the processor, a write temperature of the first data cluster after the read temperature of the first data cluster is determined to be above the first read duplication temperature threshold; and when the read temperature of the first data cluster is above the first read duplication temperature threshold and the write temperature of the first data cluster is below a first write duplication temperature threshold, selecting, by the processor, the first data cluster for duplication.

12. The method of claim 11 wherein the read duplication temperature threshold is greater than the write duplication temperature threshold.

13. The method of claim 11 further comprising determining, by the processor, whether capacity is available to store a duplicated cluster; and duplicating, by the processor, the selected first data cluster and storing the duplicated cluster if there is capacity.

14. The method of claim 13 wherein the step of determining whether capacity is available comprises the steps of determining available capacity and comparing the available capacity to a capacity threshold; and if the capacity threshold is less than the available capacity, duplicating the selected first data cluster and storing the duplicated cluster.

15. The method of claim 11 further comprising a step of:

releasing existing duplicated clusters if storage requirements of an existing duplicated cluster exceed a threshold value.

16. The method of claim 11 further comprising a step of re-evaluating, by the processor, clusters as candidates for cluster duplication.

17. The method of claim 16 wherein clusters are constantly re-evaluated, by the processor, as candidates for cluster duplication.

18. The method of claim 16 wherein clusters are periodically re-evaluated, by the processor, as candidates for cluster duplication.

19. The method of claim 11 further comprising:

determining, by the processor, when a read temperature of a second data cluster is above a second read duplication temperature threshold;

determining, by the processor, a write temperature of the second data cluster after the read temperature of the second data cluster is determined to be above the second read duplication temperature threshold; and when the read temperature of the second data cluster is above the second read duplication temperature threshold and the write temperature of the second data cluster is below a second write duplication temperature threshold, selecting, by the processor, the second data cluster for duplication.

20. The method of claim 19 wherein (i) each of the read duplication temperature thresholds has a different weighting factor associated therewith and (ii) each of the write duplication temperature thresholds has a different weighting factor associated therewith.

21. A method of managing duplication of clusters, the method comprising:

determining, by a computer processor, a read temperature of a data cluster;

when the read temperature of the data cluster exceeds a read duplication temperature threshold, determining, by the processor, a write temperature of the data cluster;

when the write temperature of the data cluster is below a write duplication temperature threshold, selecting, by the processor, the data cluster for duplication, determining, by the processor, whether storage capacity exists for storing a duplicate of the cluster, and if storage capacity exists, duplicating, by the processor, the selected data cluster and storing the duplicated cluster.

22. The method of claim 21 wherein the step of determining whether storage capacity exists for storing a duplicate of the cluster comprises determining whether an amount of storage capacity is lower than a threshold value.

23. The method of claim 21 further comprising a step of releasing duplicated clusters if an amount of storage capacity used exceeds an upper threshold value.

24. A method comprising:

determining, by a computer processor, a read temperature of a first data cluster;

when the read temperature of the first data cluster exceeds a first read duplication temperature threshold, determining, by the processor, a write temperature of the first data cluster;

when the write temperature of the first data cluster is below a first write duplication temperature threshold, selecting, by the processor, the first data cluster for duplication;

if the first data cluster is selected for duplication, duplicating, by the processor, the first data cluster to provide a second data cluster;

storing, by the processor, the second data cluster at a location which is different from where the first data cluster is stored;

determining, by the processor, a read temperature of the second data cluster;

when the read temperature of the second data cluster exceeds a second read duplication temperature threshold, determining, by the processor, a write temperature of the second data cluster;

when the write temperature of the second data cluster is below a second write duplication temperature threshold, selecting, by the processor, the second data cluster for duplication;

if the second data cluster is selected for duplication, duplicating, by the processor, the second data cluster to provide a third data cluster; and storing, by the processor, the third data cluster at a location which is different from where the first data cluster is stored and where the second data cluster is stored.

25. The method of claim 24 wherein (i) the first read duplication temperature threshold is different from the second read duplication temperature threshold and (ii) the first write duplication temperature threshold is different from the second write duplication temperature threshold.

26. The method of claim 25 wherein (i) the first read duplication temperature threshold is associated with a first weighting factor and the second read duplication temperature threshold is associated with a second weighting factor which is different from the first weighting factor and (ii) the first write duplication temperature threshold is associated with a third weighting factor and the second read duplication temperature threshold is associated with a fourth weighting factor which is different from the third weighting factor.

27. A cluster duplication management system, where the system is configured to:
   determine a read temperature of a data cluster;
   compare the read temperature to a read threshold,
   when the read temperature of the data cluster exceeds the read threshold value,
   determine a write temperature of the data cluster;
   compare the write temperature of the data cluster to a write threshold;
   when the write temperature of the data cluster is below the write threshold,
   select the data cluster for duplication, and
   store a copy of the cluster.

28. A computer programme stored on tangible media comprising executable instructions for performing a method comprising:
   determining a read temperature of a data cluster;
   comparing the read temperature to a read threshold;
   when the read temperature of the data cluster exceeds the read threshold, determining a write temperature of the data cluster;
   comparing the write temperature of a data cluster to a write threshold;
   when the write temperature of the data cluster is below the write threshold, selecting the data cluster for duplication; and
   storing a copy of the cluster.

29. A computer programme stored on tangible media comprising executable instructions for performing a method comprising:
   determining a read temperature of a data cluster;
   when the read temperature of the data cluster exceeds a read duplication temperature threshold, determining a write temperature of the data cluster;
   when the write temperature of the data cluster is below a write duplication temperature threshold, selecting the data cluster for duplication;
   determining whether storage capacity exists for storing a duplicate of the cluster, and if storage capacity exists, storing the cluster.

* * * * *